H. C. MASON.
RUBBER BOOT AND SHOE.
APPLICATION FILED JAN. 12, 1909.
1,005,256.
Patented Oct. 10, 1911.
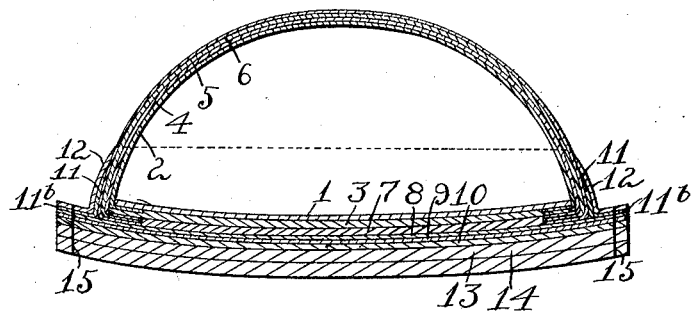
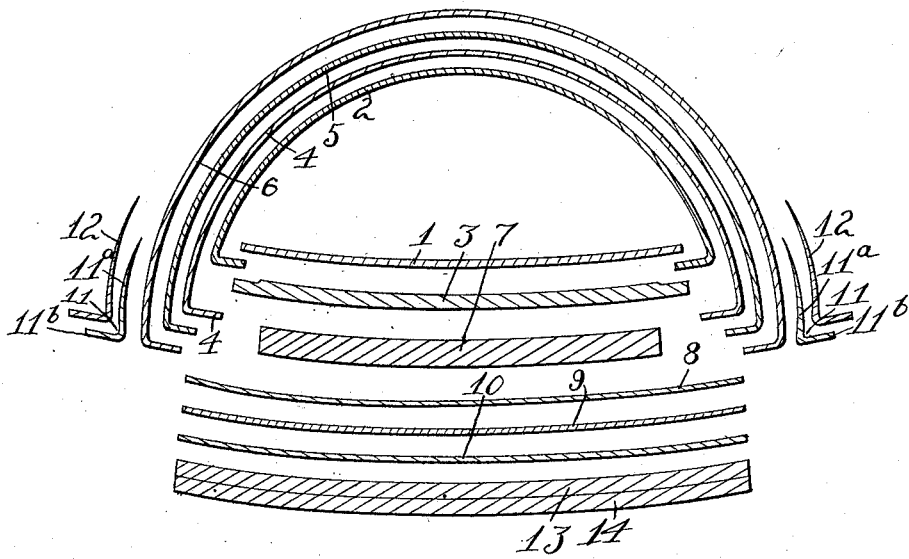
ATTEST.
Bent. M. Stahl.
Ewd L. Folsom.
INVENTOR.
HERBERT C. MASON.
BY Spear Middleton Donaldson & Spear
ATTYS.

UNITED STATES PATENT OFFICE.

HERBERT CAPRON MASON, OF PROVIDENCE, RHODE ISLAND, ASSIGNOR TO HOOD RUBBER COMPANY, OF BOSTON, MASSACHUSETTS.

RUBBER BOOT AND SHOE.

1,005,256.      Specification of Letters Patent.      Patented Oct. 10, 1911.

Application filed January 12, 1909. Serial No. 471,973.

*To all whom it may concern:*

Be it known that I, HERBERT C. MASON, a citizen of the United States, residing at Providence, Rhode Island, have invented certain new and useful Improvements in Rubber Boots and Shoes, of which the following is a specification.

My present invention relates to improvements in rubber boots or shoes, and has, among others, for its objects to provide a rubber boot made with a leather outsole, or with an outsole made of various compositions, which shall be strong and durable, and free from all liability to leak, and which may be economically produced.

The invention includes the novel features of construction hereinafter described and particularly pointed out in the claims.

A boot or shoe constructed in accordance with my invention is illustrated in the accompanying drawing, in which—

Figure 1 represents a transverse section through the forward portion of the boot or shoe, and Fig. 2 is a similar view but showing the various parts, which go to make up the complete article, separated to more clearly illustrate the invention.

Referring by reference characters to this drawing, the numeral 1 designates an inner sole, which is composed of fabric and rubber gum, and if I so desire this sole may be made of leather, or made with a composition sole, and 2 the inner lining of the upper which is likewise composed of fabric and gum, the edges of the upper being brought under and overlapping the edges of the inner lining.

3 designates a layer of fabric and gum which rests against the bottom of the inner sole with its edges overlapping the inwardly turned edges of the inner lining 2, and clamping or holding said edges between it and the edges of the inner sole.

4 designates a layer of pure gum which embraces and rests upon the outer surface of the inner lining, its edges being brought under the sole layer 3 and caused to adhere thereto. This layer 4 of pure gum is in turn covered by a layer of frictioned fabric 5, over which is another layer 6 of pure gum which forms the outer finished surface of the upper.

The edges of the layers 5 and 6 are, like the layer 4, turned inward beneath the edges of the sole layer 3, and the space beneath layer 3 between the opposing edges of the layers 4, 5 and 6, is filled by a composition of rubber and fiber 7 known in the art as a rag sole. Beneath this rubber and fiber and covering the lower surface of the same and the under side of the inwardly turned portions 6, is a sole layer 8 of pure rubber stock, beneath which is a layer of frictioned fabric 9, and a layer of rubber stock 10.

The leather or composition sole is applied to the outer surface of the layer 10, and is preferably formed of two layers 13 and 14, as shown.

11 designates a strip of frictioned fabric, a part 11ª of which lies against the lower portion of the outer layer 6 of the upper, while the other part 11ᵇ is turned outwardly and rests upon the top of the projecting edge portion of sole layer 8. A similar strip 12 of pure gum covers the strip 11, the edges of both of these being preferably beveled so as not to show the line of juncture in the finished boot.

The parts thus described are assembled over a last, prior to vulcanization, in the manner well understood by those skilled in the art.

In order to further connect the leather sole in place and hold all the sole parts firmly to the upper, I pass a line of stitches through the projecting edges or welt sole as indicated at 15 in Fig. 1.

From the foregoing description it will be seen that I provide a boot or shoe having a welt sole in which the several layers of the upper and sole overlap or interlock, thus forming a firm connection, avoiding the necessity of any internal stitching, while the line of stitching through the welt effectually ties the edge of the leather sole to the upper and avoids all danger of separation thereof at the edge or edges, thus securing a firm connection and at the same time an absolutely water proof article. While I have specified a leather sole, I do not confine myself to a leather sole. I may use a molded rubber sole, or various compositions, such as horn fiber, compressed pulp, and the like.

I do not confine myself to the number and kind of upper layers 2, 4, 5 and 6. It would be practical for me to leave out layer 4, for instance, altogether; or to leave out layer 4 and substitute a narrow strip covering the joint between the parts 2 and 3. I also do not confine myself to three layers, 8, 9 and 10. I may use any number of layers that I find convenient, so long as I use a pure rubber layer 8 to make the boot watertight. It may be convenient for me, for instance, to omit 10 and put the leather sole against 9; or I might care to add a frictioned fabric sole between 9 and 10 for the purpose of holding cement.

Having thus described my invention, what I claim is:—

1. A rubber boot or shoe having a welt sole, and an upper composed of layers of fabric and rubber with the edges of the upper turned inwardly and secured to the sole, and a folded double strip comprising a layer of fabric and a layer of rubber lying in the angle between the welt sole and upper, the layer of rubber extending above the edge of the fabric and joining the outer rubber surface of the upper, the whole being vulcanized together, substantially as described.

2. In a rubber boot or shoe, an upper composed of superimposed layers of fabric and rubber, and pure rubber, having inwardly turned edges, an inner sole composed of superimposed layers of fabric and rubber having their edges alternately overlapping the innermost layers of the upper, a rag sole below the insole having its edges abutting the edges of the outer layers of the upper, a series of layers of pure rubber and frictioned fabric below the rag sole, and an outer leather sole, said series of layers and leather sole extending beyond the upper to form a welt sole, and a folded double strip comprising a layer of frictioned fabric and a layer of pure rubber lying in the angle between the welt sole and upper, the layer of pure rubber of said strip extending above the edge of the frictioned fabric and joining the outer layer of the rubber, the whole being vulcanized together, substantially as described.

In testimony whereof, I affix my signature in presence of two witnesses.

HERBERT CAPRON MASON.

Witnesses:
C. H. ROPER,
A. A. GLIDDEN.

Copies of this patent may be obtained for five cents each, by addressing the "Commissioner of Patents, Washington, D. C."